United States Patent [19]

Lagemann

[11] 3,714,472

[45] Jan. 30, 1973

[54] MULTIPLE-INPUT BISTABLE MULTIVIBRATOR

[75] Inventor: Klaus Lagemann, Achternvelde, Germany

[73] Assignee: U.S. Philips Corporation, New York, N.Y.

[22] Filed: July 28, 1971

[21] Appl. No.: 166,983

Related U.S. Application Data

[63] Continuation of Ser. No. 768,365, Oct. 17, 1968, abandoned.

[30] Foreign Application Priority Data

Oct. 21, 1967 Germany....................P 15 37 298.2

[52] U.S. Cl...................................307/291, 307/247

[51] Int. Cl..............................................H03k 3/286

[58] Field of Search.......................307/247, 291, 208

[56] References Cited

UNITED STATES PATENTS

| | | | |
|---|---|---|---|
| 3,407,389 | 10/1968 | Klein | 307/291 X |
| 3,424,928 | 1/1969 | Priel et al. | 307/291 |
| 3,435,257 | 3/1969 | Lawrie | 307/291 X |
| 3,541,356 | 11/1970 | Lagemann | 307/291 X |

*Primary Examiner*—John S. Heyman
*Attorney*—Frank R. Trifari

[57] ABSTRACT

A bistable multivibrator having two complementary outputs, two unidentical inputs V and D and one clock-pulse input. The logical connection between inputs and outputs is arranged so that at the application of a signal "1" to the input V one output indicates subsequent to the reception of a clock pulse at the clock-pulse input, always that signal "0" or "1" that has been applied to the input D prior to the reception of the clock pulse. At the application of the signal "0" to the input V the output does not change state at the reception of a clock pulse independently of the signal at the input D.

6 Claims, 17 Drawing Figures

INVENTOR
KLAUS LAGEMANN

BY
[signature]
AGENT

INVENTOR.
KLAUS LAGEMANN
BY
Frank R. Trifari
AGENT

INVENTOR.
KLAUS LAGEMANN
BY
AGENT

INVENTOR.
KLAUS LAGEMANN
BY
Frank R. Trifari
AGENT

INVENTOR.
KLAUS LAGEMANN
BY
AGENT

INVENTOR.
KLAUS LAGEMANN
BY
[signature]
AGENT

MULTIPLE-INPUT BISTABLE MULTIVIBRATOR

This is a continuation of Ser. No. 768,356, filed Oct. 17, 1968, now abandoned.

The development of integrated digital subassemblies has brought about the desire to make use of standard modules having a fixed number of connections for reasons of manufacture and application. This involves the problem of how to utilize to the optimum these connections for the logical function of the circuitry contained in the module. This problem is particularly important with bistable multivibrators.

The invention relates to a bistable multivibrator having two complementary outputs, two unidentical inputs V and D and one clock-pulse input. The logical connection between inputs and outputs is arranged so that at the application of a signal "1" to the input V one output indicates subsequent to the reception of a clock pulse at the clock-pulse input, always that signal "0" or "1" that has been applied to the input D prior to the reception of the clock pulse. At the application of the signal "0" to the input V the output does not change state at the reception of a clock pulse independently of the signal at the input D.

This function may be illustrated in a truth table as follows:

| $t_n$ | | $t_{n+1}$ |
|---|---|---|
| $V^n$ | $D^n$ | $Q^{n+1}$ |
| 0 | 0 | $Q^n$ |
| 0 | 1 | $Q^n$ |
| 1 | 0 | 0 |
| 1 | 1 | 1 |

Such a multivibrator is already known under the name of "DV-flip-flop" (K. Lagemann: Das DV-Flipflop, ein neuartiges Bau-element und seine Vorzuge gegenuber dem JK-Flip-flop, Elektronische Rechenanlagen 1, 1967). Various uses of the DV-flip-flop are described therein, particularly for counters and shift registers. In many uses it is now found that in front of the inputs of the DV-flip-flop additional gates are required for obtaining a desired operation of the assembly.

Since in integrated, digital subassemblies the cost factor is mainly formed by the number of modules, whereas the function or the number of individual functions in a module does substantially not affect the cost of the module, it would be advantageous to integrate the additional gates in the multivibrator subassembly so that also the practical structure would be simplified.

However, with different uses different gates are required in front of the inputs. The manufacture of different subassemblies in which different gates precede the same flip-flop, is, however, not at all attractive, inter alia because of the great variety to be stored, Instead a subassembly is aimed at which is as versatile as possible by structure and function.

The invention is characterized in that at least one input of the so called DV-flip-flop is preceded by a multi-stage switching network comprising and-gates and or-gates. By means of the additional inputs thereof the available connections of a module can be utilized to the optimum, while new subassemblies are obtained which can be employed in a considerable more advantageous and versatile manner than a simple DV-flip-flop, which will be illustrated by way of example with reference to counters and shift registers. If an adequate number of connections is available, also the other input may be extended by one- or multi-stage switching networks, so that additional possibilities of use are obtained.

The drawing shows embodiments of the invention.

Herein:

Figure 1:
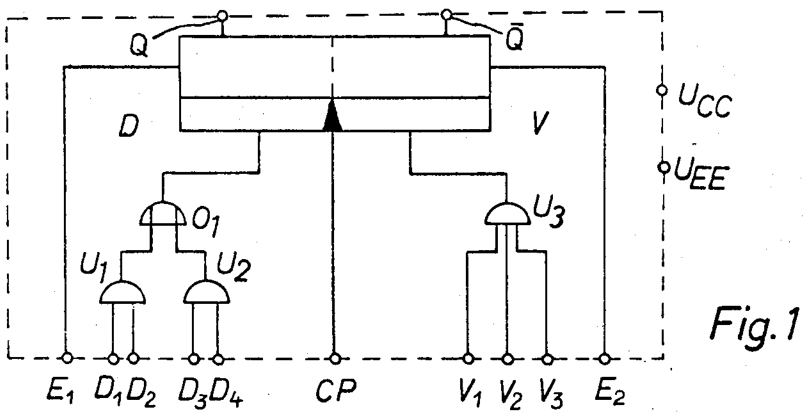
FIG. 1 shows the extension of a DV-flip-flop by a two-stage network at the D-input.

A preferred embodiment is shown in FIG. 1, in which the D-input is preceded by an or-gate and the latter is preceded by two and-gates having two inputs each and in which the V-input is extended by an and-gate having three inputs so that in total 14 connections including two for the application of power ($U_{CC}$ and $U_{EE}$) are provided by this module, the outlines of which are shown symbolically in dashed lines.

Figure 2:
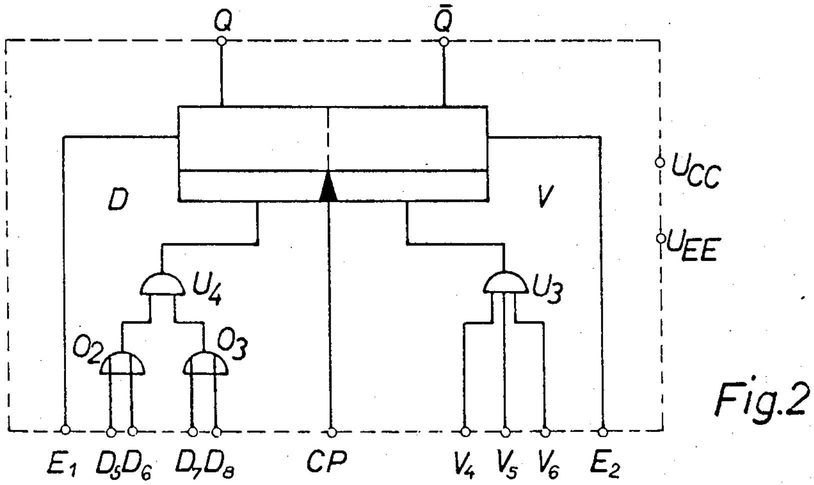
FIG. 2 shows an equivalent embodiment.

An equivalent form (FIG. 2) is obtained by inverting the and-or order of the connecting means preceding the D-input into the or-and order. It is a particular advantage of the DV-flip-flop that of the arrangements shown in FIGS. 1 and 2 only one need be carried into effect because one can be changed over into the other by complementation of the signals at the inputs $D_1$ to $D_4$ and by the exchange of the outputs Q and $\bar{Q}$.

Figure 3:
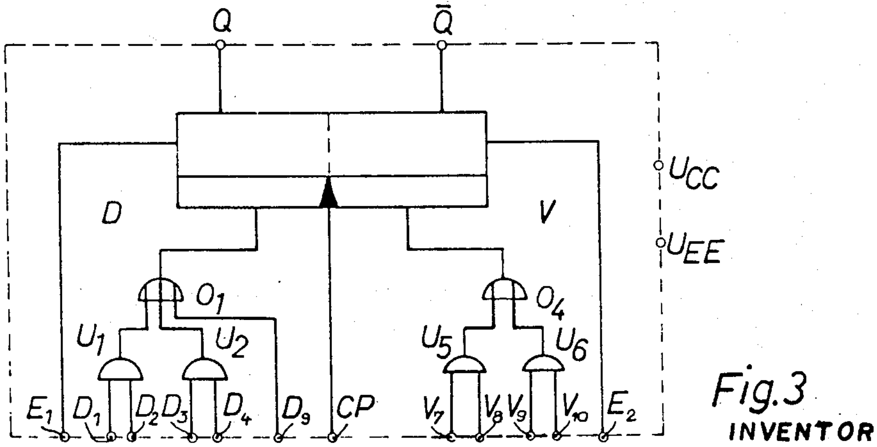
FIG. 3 shows further extensions at the D- and V-inputs.
Figures 4, 5, 6:
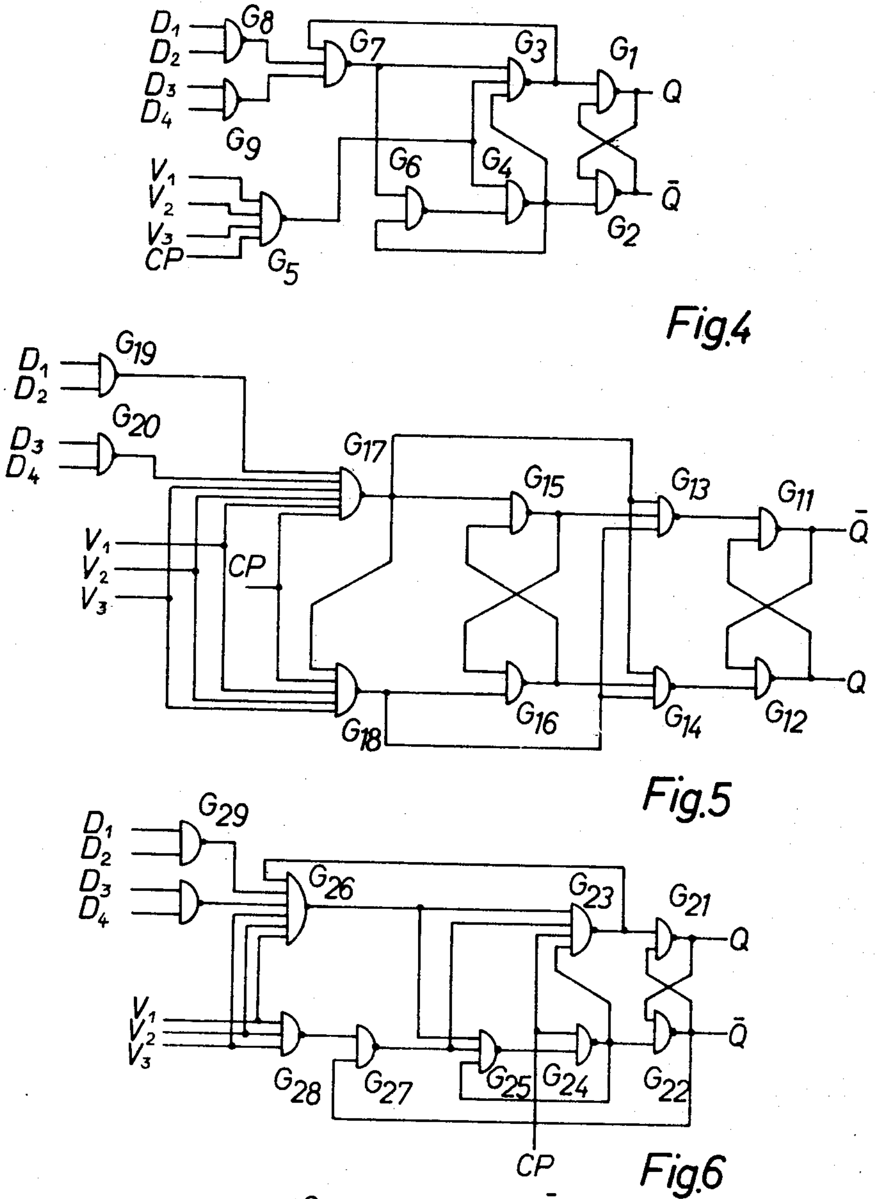
FIG. 4 illustrates the insertion of the extension gates into the structure of the DV-flip-flop.
FIGS. 5 and 6 illustrate the integration in a DV-flip-flop of different logical structure.

If the number of connections practicable at the module allows, a further multiplication of the inputs is possible. For example, 16 connections allow for a further input $D_5$ and hence also a two-stage form for the multiplication of the V-input as is illustrated in FIG. 3. The gates preceding the inputs may be partly united with the gates of the DV-flip-flop so that the additional costs are at a minimum. The following examples are based on the extension illustrated in FIG. 1. According to FIG. 4 the function of gate $O_1$ of FIG. 1 is performed by the gate $G_7$. The function of gate $U_3$ of FIG. 1, is performed by the gates $G_5$, which thus have more inputs. Only the gates $U_1$ and $U_2$ of FIG. 1 remain sole gates $G_8$ and $G_9$.

With the further embodiments (FIGS. 5 and 6) also similar relations are found.

By using boolean algebra the nand-gates indicated in the embodiments may be replaced in total or partly by and-/nor- gates and/or nor-gates. This provides an unlimited number of variants.

In the embodiments mentioned above the inputs for static setting and resetting are omitted. They may be added in known manner without increasing the number of connections means.

As a symbol for the flip-flop in the embodiments shown in FIG. 1 and in the associated, further detailed embodiments shown in FIGS. 4, 5 or 6 FIG. 7 is chosen. The functional behavior of this flip-flop is illustrated by the truth table above. For the magnitudes D and V and the accessible real inputs $D_1$ to $D_4$ and $V_1$ to $V_3$ the following boolean relations are found (FIG. 1):

$$D=D_1 D_2 V D_3 D_4$$

$$V=V_1 V_2 V_3$$

Figure 7:
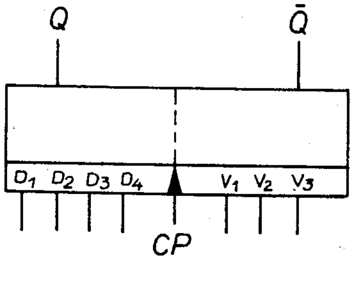
FIG. 7 shows the symbols for the embodiment of FIG. 1.
Figure 8:
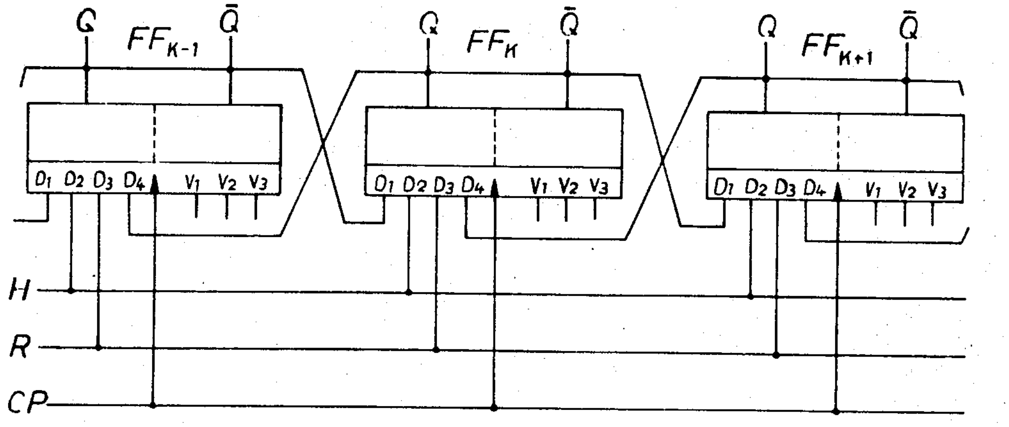
FIG. 8 shows a shift register for two shift directions.

The advantage of the flip-flop according to the invention also becomes manifest in the possibilities of use, A forward and backward counting shift register is obtained as is shown in FIG. 8 by the flip-flops shown in FIGS. 1 or 7. The following advantages are obtained:

*a.* The use aimed at requires only the four inputs $D_1$ to $D_4$. Therefore, the circuitry between the individual flip-flops in the embodiment of FIG. 8 is considerably simpler than in other known flip-flop arrangements.

*b.* In the embodiment of FIG. 8 the inputs $V_1$ to $V_3$ are not used. The very nature of the DV-flip-flop permits of storing the actual flip-flop state at the V-inputs at will and hence of shielding it against the effect of the clock pulse. The free V-inputs of FIG. 8 may therefore be employed for additional control-purposes, for example, for blocking at will some or all flip-flops.

Figure 9:
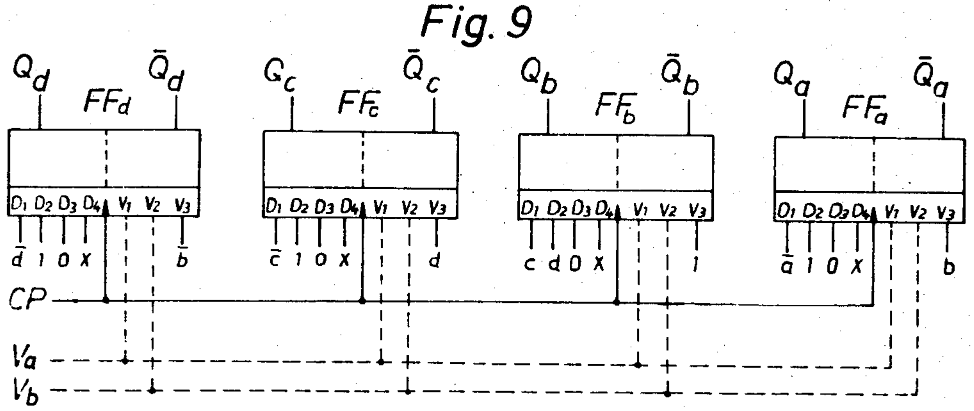
FIG. 9 shows a mod-10 counter in 5–4 –2 –1-code.

FIG. 9 shows four flip-flops in a mod-10 counter in the known 5–4–2–1 code:

| Decimal | *a* | *b* | *c* | *d* |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

The inputs having a reference have to be considered to be connected to the correspondingly referenced output. The sign "X" means either 0 or 1 as the case may be. The connection indicated by broken lines of the $V_1$ and $V_2$ inputs are not required for the operation of the mod-10 counter. However, they permit additional blocking which may be useful, for example, for a mod-100 counter in the 5–4–2–1-code.

Figure 10:
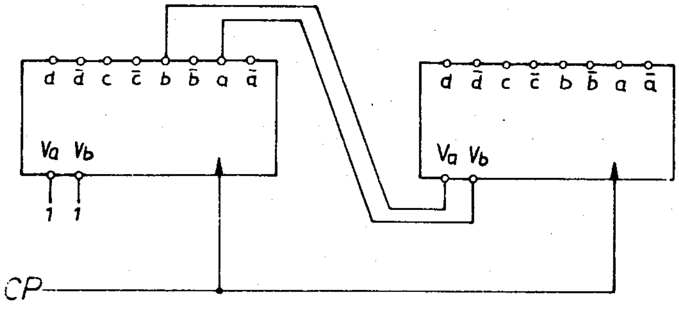
FIG. 10 shows a mod-100 counter having the circuitry of FIG. 9 as a symbol.
Figure 11:
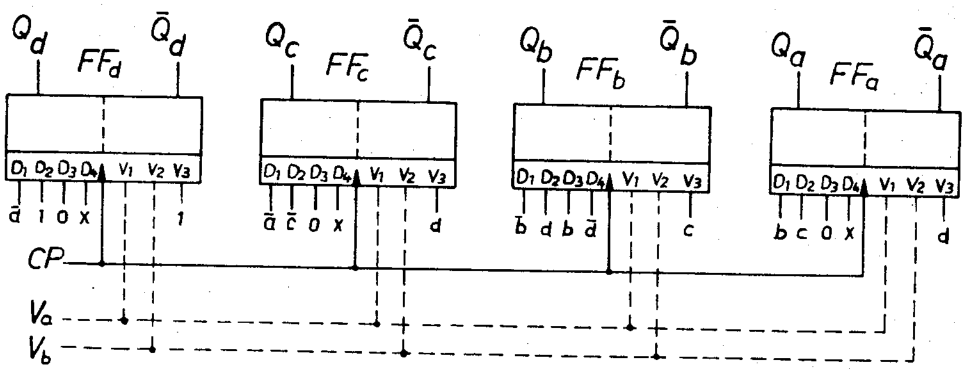
FIG. 11 shows a mod-10 counter in 8–4–2–1–code.

In FIG. 10 two counters as shown in FIG. 9 are represented each by its own rectangular symbol and interconnected in the manner shown. This mod-100 counter apparently does not require additional connecting means. Via each and-gate having two inputs a further mod-10 counter can be connected to the preceding one so that synchronous multi-decade counters of any desired counting capacity can be obtained, FIG. 11 shows in a similar manner first a conventional mod-10 counter in the 8-4-2-1-code (dual-code, direct binary code, BCD-code):

| Decimal | *a* | *b* | *c* | *d* |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

Figure 12:
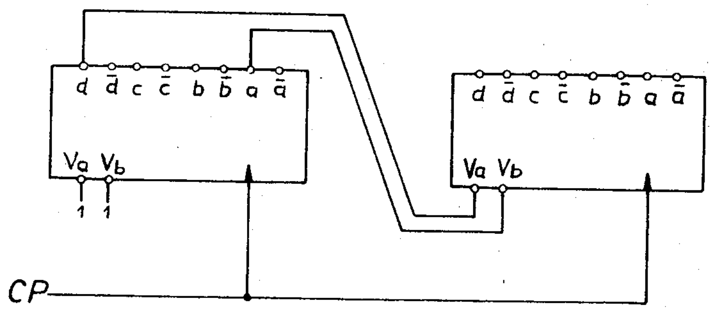
FIG. 12 shows a mod-100 counter with the circuitry of FIG. 11 as a symbol.

FIG. 12 shows two of these mod-10 counters joined to form a synchronous mod-100 counter without additional connecting means. Also in this case the extension of the counting capacity may be obtained by one and-gate for each mod-10 stage.

Figure 13:
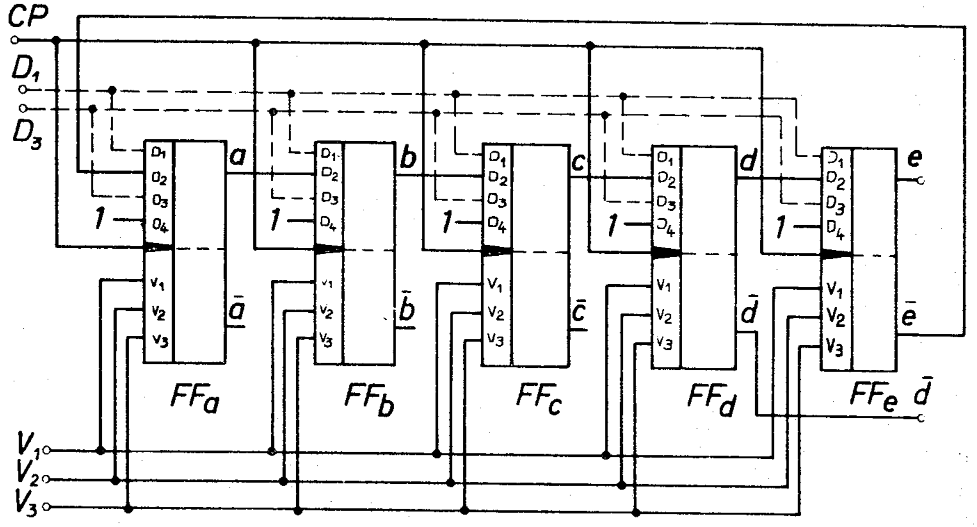
FIG. 13 shows a special mod-10 counter.

FIG. 13 shows the mod-10 counter comprising 5 flip-flops. For the sake of simplicity the outputs of the flip-flops are indicated only by their indices. In known manner the main outputs *a*, *b*, *c* and *d* of the flip-flops $FF_a$, $FF_b$, $FF_c$ and $FF_d$ are connected to the input $D_2$ of every further flip-flop. The additional output $\bar{e}$ of the flip-flop $FF_e$ is connected to the input $D_2$ of the flip-flop $FF_a$. This results in the following counting code:

| Decimal | *a* | *b* | *c* | *d* | *e* |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |

The use of the flip-flops for this counter permits of providing additional control-functions for the inputs $D_1$, $D_3$ and $V_1$ to $V_3$. In the connection shown by way of example in FIG. 13 between all $D_1$ and all $D_3$ inputs normal counting is performed for the signal combination $D_1 = 1$, $D_3 = 0$; with $D_1 = 0$, $D_3 = 0$ all flip-flops change over to the state 0 at the next-following clock pulse and with $D_3 = 1$ ($D_1$ either 1 or 0) all of them get into the state 1. Through the inputs $V_1$, $V_2$ and $V_3$ the flip-flops can be decoupled with respect to the effect of the clock pulse. If said control-functions are not required, the connections emanating from the inputs $D_1$, $D_3$, $V_1$, $V_2$ and $V_3$ are omitted.

Figure 14:
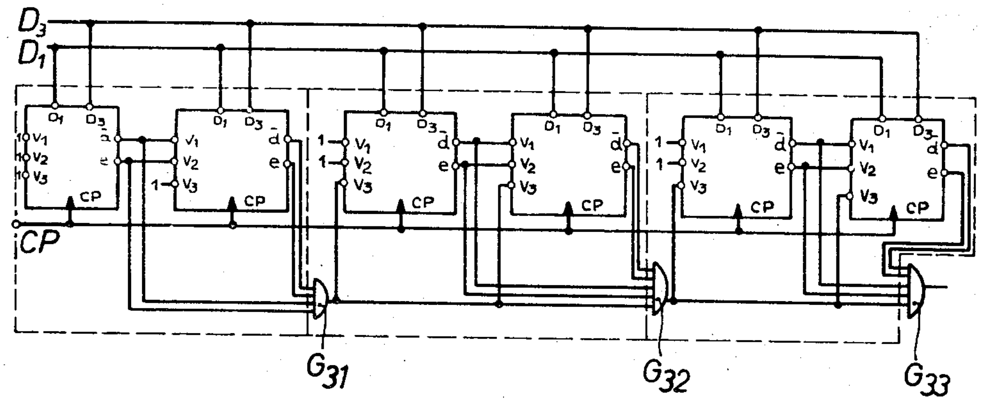
FIG. 14 shows a mod-$10^m$ counter having the circuitry of FIG. 13 as a symbol.

In FIG. 13 the points $D_1$, $D_3$, $V_1$, $V_2$, $V_3$, Cp, *d* and *e* are marked by small circles. They represent the externally effective connections of the mod-10 counting unit, six of which are combined (see FIG. 14) to form a mod-$10^6$ counter. Each rectangular symbol of FIG. 14 represents the mod-10 counter described with reference to FIG. 13. By providing one and-gate for every two mod-10 counting units the counting capacity can be raised by a factor 100.

Figure 15:
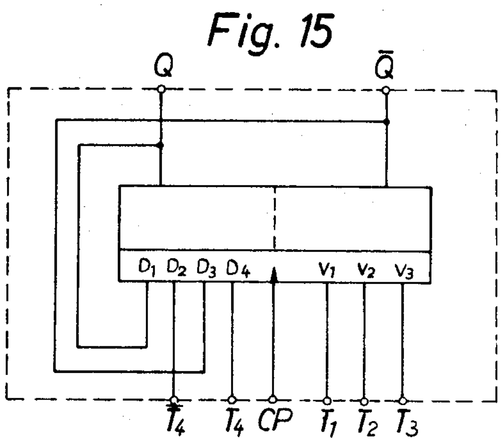
FIG. 15 shows the circuitry of FIG. 7 as a T-flip-flop.
Figure 16:
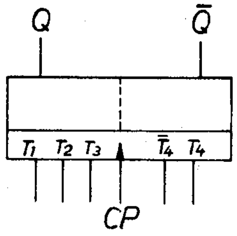
FIG. 16 shows the symbols thereof.

When as is shown in FIG. 15, the inputs $D_1$ and $D_3$ are connected to the outputs Q and $\bar{Q}$ respectively, the T-flip-flop is obtained now having four control-inputs $T_1$, $T_2$, $T_3$ and $T_4$ basically interconnected in conjunctive fashion. A further input $\bar{T}_4$ has invariably to receive the signal complementary to $T_4$. The arrangement is represented by the symbol of FIG. 16.

By means of T-flip-flops having four T-inputs mod-$2^m$ counters in dual code can be composed without many additional connecting means, wherein $m$ designates the number of code places and at the same time the number of required bistable flip-flops. The dual code is composed as follows:

| m = 1 | a |
|---|---|
| | 0 |
| | 1 |

| m = 2 | a | b |
|---|---|---|
| | 0 | 0 |
| | 0 | 1 |
| | 1 | 0 |
| | 1 | 1 |

| m = 3 | a | b | c | |
|---|---|---|---|---|
| | 0 | 0 | 0 | |
| | 0 | 0 | 1 | |
| | 0 | 1 | 0 | |
| | 0 | 1 | 1 | |
| | 1 | 0 | 0 | |
| | 1 | 0 | 1 | |
| | 1 | 1 | 0 | |
| | 1 | 1 | 1 | and so on. |

Figure 17:
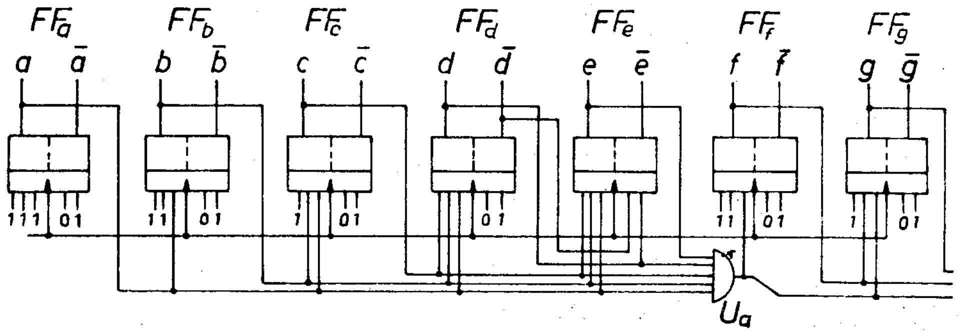
FIG. 17 shows a mod-$2^m$ counter having the symbol of FIG. 16.

The dual code may be extended arbitrarily in accordance with the known strict law, which will be apparent from these examples. For the first five flip-flops ($m = 5$) FIG. 17 shows a mod-32 counter in dual code. Through each and-gate having five inputs four further flip-flops can be connected, the counting capacity each time increasing by a factor 16. In the symbols of the flip-flops of FIG. 17 the input indices of FIG. 16 are to be considered to be included.

Since the inputs $D_1$ and $D_2$ of the embodiment shown in symbols in FIG. 7 are identical, they may be exchanged in all embodiments shown herein. This also applies to the inputs $D_3$ and $D_4$ as well as to the inputs $V_1$, $V_2$ and $V_3$.

What is claimed is:

1. A digital computer module having input and output terminals, comprising a clocked bistable multivibrator means having two outputs, a clock pulse input and at least two signal inputs, a first of said multivibrator outputs providing a logical "1" signal in response to the concurrence of a logical "1" signal on both a first and a second multivibrator input and a clock pulse on said clock pulse input, the first output providing a "0" logical signal in response to the concurrence of a "0" logical signal on the first of the multivibrator signal inputs and a logical 1 signal on a second of said multivibrator signal inputs and a clock pulse on said clock pulse input, said first multivibrator output providing an output signal identical to an output signal on said first multivibrator output at a previous clock pulse in response to a 0 logic signal on the second multivibrator signal input independent of the signal on the first multivibrator signal input, a multistage logic circuit having inputs and having an output connected to at least one of the signal inputs of the multivibrator and comprising at least three logic gates each having outputs and inputs, the inputs of the first two of the three logic gates being connected to inputs of the multistage logic circuit, an output of the third of the three logic gates being connected to an output of the multistage logic circuit and means for connecting inputs of the third logic gate to outputs of the first two logic gates, means for connecting each of the outputs of the multivibrator to a separate output terminal of the module, means for connecting inputs of the multistage logic circuit to input terminals of the module, means for connecting the clock pulse input of the multivibrator to a separate input terminal of the module, and means for connecting input terminals of the module to a signal input of the multivibrator other than the signal input connected to the multistage logic circuit.

2. A module as claimed in claim 1 wherein the multistage logic circuit comprises an or-gate having at least two inputs and an output, means for connecting the output of the or-gate to the first signal input of the multivibrator, a first and-gate having an output and at least two inputs, a second and-gate having an output and at least two inputs, means for connecting the output of the first and second and-gate to the inputs of the or-gate, and means for connecting the input terminals of the module to the inputs of the and-gates, and wherein the means for connecting the second signal input of the multivibrator to an input terminal of the module comprises a third and-gate having an output and at least three inputs, means for connecting the output of the third and-gate to the second signal input of the multivibrator, and means for connecting at least three input terminals of the third and-gate to at least three separate input terminals of the module.

3. A module as claimed in claim 1 wherein the multistage logic circuit comprises a first and-gate having an output and two inputs, means for connecting the output of the first and-gate to the first signal input of the multivibrator, a first or-gate having an output and at least two inputs, a second or-gate having an output and at least two inputs the outputs of the first and second or-gates to the inputs of the first and-gate, means for connecting the inputs of the first and second or-gates to separate input terminals of the module, and wherein the means for connecting the second signal input of the multivibrator to an input terminal of the module comprises a second and-gate having an output and at least three inputs, means for connecting the output of the second and-gate to the second signal input of the multivibrator, and means for connecting each of the inputs of the second and-gate to separate input terminals of the module.

4. A module as claimed in claim 1, wherein the multistage logic circuit comprises a first or-gate having an output and at least three inputs, means for connecting the output of the first or-gate to the first signal input of the multivibrator, a first and-gate having an output and at least two inputs, a second and-gate having an output and at least two inputs, means for connecting the outputs of the first and second and-gates to the or-gate, means for connecting input terminals of the module to each of the inputs of the first and second and-gates and to an input of the first or-gate, and wherein the means for connecting the second signal input of the multivibrator to an input terminal of the module comprises a second or-gate having an output and at least two inputs, means for connecting the output of the second or-gate to the second signal input of the multivibrator, a third and-gate having an output and at least two inputs, a fourth and-gate having an output and at least two inputs, means for connecting the outputs of the third and fourth and-gates to inputs of the second or-gate, and means for connecting a separate input terminal of the module to each of the inputs of the third and fourth and-gates.

5. A module as claimed in claim 1, wherein the multivibrator comprises a first nand-gate having an output connected to the signal input of the multivibrator, wherein the multistage logic circuit comprises a second and third nand-gate said second and third nand-gates each having an output and at least two inputs, wherein the inputs of the second and third nand-gates are each connected to a separate input terminal of the module, wherein the outputs of the second and third nand-gates are connected to inputs of the first nand-gate in the multivibrator, and wherein the first input nand-gate of the multivibrator performs functions of a stage in the multistage logic circuit most remote from the input terminals of the module.

6. Apparatus as claimed in claim 5, wherein the multivibrator further comprises a fourth nand-gate, a fifth nand-gate, a sixth nand-gate, a seventh nand-gate, and an eighth nand-gate, each of said fourth, fifth, sixth, seventh, and eighth, nand-gates having an output and at least two inputs, means for connecting the output of the first nand-gate to inputs of the fourth and fifth nand-gates, means for connecting the output of the fifth nand-gate to the inputs of the first and seventh nand-gates, means for connecting the output of the fourth nand-gate to an input of the sixth nand-gate means for connecting the output of the sixth nand-gate to inputs of the fourth, fifth, and eighth nand-gates, means for cross coupling the seventh and eighth nand-gates, means for connecting the outputs of the multivibrator to each of the outputs of the seventh, and eighth nand-gates, a ninth nand-gate having input and outputs, means for connecting the second signal input of the multivibrator and the clock pulse input of the multivibrator to inputs of the ninth nand-gate, and means for connecting the output of the ninth nand-gate to inputs of the fifth and sixth nand-gates.

* * * * *